United States Patent [19]

Fukada et al.

[11] Patent Number: 5,319,022
[45] Date of Patent: Jun. 7, 1994

[54] ETHYLENE COPOLYMER MOLDED STRUCTURE AND ETHYLENE COPOLYMER COMPOSITION

[75] Inventors: Toru Fukada, Ichihara; Hiroshi Ito, Chiba, both of Japan

[73] Assignee: Du Pont-Mitsui Polychemicals Co., Ltd., Tokyo, Japan

[21] Appl. No.: 927,636
[22] PCT Filed: Dec. 26, 1991
[86] PCT No.: PCT/JP91/01765
§ 371 Date: Aug. 26, 1992
§ 102(e) Date: Aug. 26, 1992
[87] PCT Pub. No.: WO92/12202
PCT Pub. Date: Jul. 23, 1992

[30] Foreign Application Priority Data

Dec. 27, 1990 [JP] Japan .................. 2-415153
Jan. 10, 1991 [JP] Japan .................. 3-012391

[51] Int. Cl.$^5$ .................................. C08L 29/04
[52] U.S. Cl. .................................. 525/57; 428/500; 428/515; 428/516; 428/518; 428/520; 428/522; 428/523; 524/503
[58] Field of Search .............. 525/57; 428/500, 515, 428/516, 518, 520, 522, 523; 524/503

[56] References Cited

U.S. PATENT DOCUMENTS

| | | | |
|---|---|---|---|
| 4,410,482 | 10/1983 | Subramanian | 264/515 |
| 4,657,972 | 4/1987 | Giles, Jr. et al. | 525/58 X |
| 5,034,281 | 7/1991 | Kawasaki et al. | 524/503 X |

FOREIGN PATENT DOCUMENTS

| | | |
|---|---|---|
| 3233693 | 3/1984 | Fed. Rep. of Germany . |
| 30104 | of 1976 | Japan . |
| 51-30104 | 8/1976 | Japan . |
| 53-11032 | 4/1978 | Japan . |
| 55-12107 | of 1980 | Japan . |
| 121017 | of 1980 | Japan . |
| 55-155042 | 12/1980 | Japan . |
| 61-81448 | 4/1986 | Japan . |

*Primary Examiner*—Judy M. Reddick
*Attorney, Agent, or Firm*—Webb, Ziesenheim, Bruening, Logsdon, Orkin & Hanson

[57] ABSTRACT

The first molded structure of the present invention is formed from ethylene copolymer compositions comprising (A) 50–80% by weight of an ethylene/unsaturated ester copolymer, and (B) 50–20% by weight of an ethylene/vinyl alcohol copolymer having an apparent melt viscosity, as measured at 220° C. and a rate of shear of 100 sec$^{-1}$, smaller by 300–1000 Pa·s than that of said ethylene/unsaturated ester copolymer (A), said molded structures having a stratiform structure wherein said ethylene/vinyl alcohol copolymer (B) has been dispersed into said molded structure in the form of thin layers.

The first ethylene copolymer compositions according to the invention are the same as those mentioned above, except that parts of the above-mentioned component (A) have been replaced by a graft modified product (C) of an ethylene/α-olefin copolymer, and are excellent in heat stability, film forming properties and extrusion kneading properties.

The second molded structures according to the invention are formed from the first ethylene copolymer compositions as mentioned above, and have the same stratiform structures as in the first molded structures.

The first and second molded structures mentioned above are excellent in gas barrier properties and pinhole resistance.

7 Claims, 1 Drawing Sheet

ETHYLENE COPOLYMER MOLDED STRUCTURE AND ETHYLENE COPOLYMER COMPOSITION

FIELD OF INDUSTRIAL APPLICATION

This invention relates to ethylene copolymer molded structures and ethylene copolymer compositions and more particularly to molded structures comprising ethylene copolymer excellent in gas barrier properties and pinhole-free properties, and to ethylene copolymer compositions excellent in drawing properties at the time of molding, film-forming properties and heat stability.

TECHNOLOGICAL BACKGROUND

When molded into film or the like, ethylene/vinyl alcohol copolymers containing vinyl alcohol structural units in a high proportion exhibit excellent gas barrier properties, and hence they are used widely as packaging material. However, the ethylene/vinyl alcohol copolymers have such problems that they are liable to water absorption, poor in drawability as well as in heat resistance, and are difficult to mold at high temperature. In the molded articles obtained from the above-mentioned copolymers, there are such problems that they deteriorate in gas barrier properties on account of the water absorption properties of said copolymers, they are insufficient in impact resistance in a dry state and, moreover, they are poor in pinhole resistance.

On that account, the ethylene/vinyl alcohol copolymers as mentioned above are used singly rarely if ever and are used usually in combination with other materials. As an example of the combination use referred to above, there may be mentioned a multi-ply laminates prepared by laminating an interlayer composed of the ethylene/vinyl alcohol copolymer with other materials. Further, there have been proposed numbers of methods intended to obtain modified compositions by blending the above-mentioned copolymers and other resins. In the blending methods as mentioned above, however, it is difficult to obtain ethylene/vinyl alcohol copolymer compositions in which the defect of said copolymer has been removed markedly when the ethylene/vinyl alcohol is used as a main component of the resulting blend. On the other hand, when the resin other than the ethylene/vinyl alcohol copolymer is used as a main component of the resulting blend, it has heretofore been difficult to obtain compositions excellent in gas barrier properties owing to the ethylene/vinyl alcohol copolymer.

In recent years, there have been proposed molded articles excellent in gas barrier properties, said molded articles being obtained from ethylene/vinyl alcohol copolymer compositions prepared by blending ethylene/vinyl alcohol copolymers and other resins. For example, Japanese Patent Publn. No. 30104/1976 proposes molded structures having a stratiform structure and different in content of an ethylene/vinyl alcohol copolymer in the direction of thickness, said structures being obtained by molding a composition comprising polyolefin and ethylene/vinyl alcohol copolymers into a desired shape under specific conditions. Further, Japanese Patent L-O-P Publn. No. 121017/1980 discloses a stratiform molded article of polymer composition containing 60-95% by weight of polyolefin, vinyl alcohol (co)polymer and alkylcarboxyl-substituted polyolefin. The copolymers of polyolefin and ethylene/vinyl alcohol copolymers as disclosed in the publications cited above, however, are poor in compatibility and tend to become poor in moldability, and it is therefore not always easy to mold these polymers into thin-layer films, and the thin-layer films obtained, if any, are required to show a further improvement in gas barrier properties.

The present invention is intended to solve such problems involved in the prior art as mentioned above, and an object of the invention is to provide ethylene copolymer molded structures excellent in gas barrier properties, pinhole resistance and the like.

A further object of the invention is to provide ethylene copolymer compositions excellent in drawing properties, film-forming properties and heat stability at the time of molding thereof and, at the same time, excellent in gas barrier properties and pinhole resistance.

DISCLOSURE OF THE INVENTION

The first ethylene copolymer molded structure of the present invention comprises an ethylene copolymer composition comprising
(A) 50-80% by weight of an ethylene/unsaturated ester copolymer having 85-65% by weight of ethylene structural units, 15-35% by weight of unsaturated ester structural units, and a melt flow rate of 0.5-20 g/10 min as measured at 190° C. under a load of 2160 g, and
(B) 50-20% by weight of an ethylene/vinyl alcohol copolymer having 50-20 mol% of ethylene structural units, 50-80 mol% of vinyl alcohol structural units, and a melt flow rate of 0.5-30 g/10 min, said ethylene/vinyl alcohol copolymer (B) having an apparent melt viscosity, as measured at 220° C. and a rate of shear of 100 sec$^{-1}$, smaller by 300-1000 Pa·s than that of said ethylene/unsaturated ester copolymer (A), and said ethylene/vinyl alcohol copolymer (B) being dispersed into said molded structure in the form of thin layers.

The first ethylene copolymer composition of the invention comprises
(A) 30-75% by weight of an ethylene/unsaturated ester copolymer having 85-65% by weight of ethylene structural units, 15-35% by weight of unsaturated ester structural units, and a melt flow rate, as measured at 190° C. under a load of 2160 g, of 0.5-20 g/10 min,
(B) 50-20% by weight of an ethylene/vinyl alcohol copolymer having ethylene structural units of 50-20 mol%, 50-80 mol% of vinyl alcohol structural units, and a melt flow rate, as measured at 210° C. under a load of 2160 g, of 0.5-30 g/10 min, and
(C) 1-40% by weight of a graft-modified product of a noncrystalline or low crystalline ethylene/α-olefin copolymer having 60-90 mol% of ethylene structural units with an unsaturated carboxylic acid or its anhydride, said ethylene/vinyl alcohol copolymer (B) having an apparent melt viscosity, as measured at 220° C. and a rate of shear of 100 sec$^{-1}$, smaller by 300-1000 Pa·s than that of said ethylene/unsaturated ester copolymer (A).

The second molded structure of the invention comprises the ethylene copolymer compositions as mentioned above, said ethylene/vinyl alcohol copolymer (B) being dispersed into said molded structure in the form of thin layers.

Figure 1:
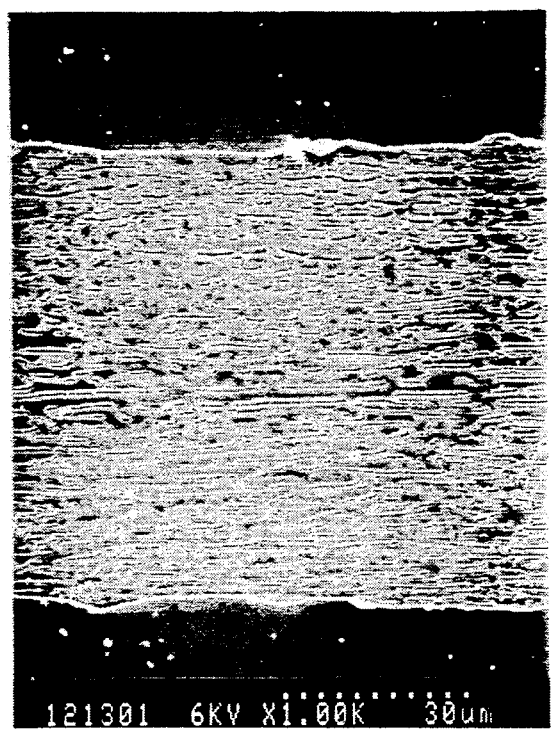
FIG. 1 is a photograph of an electron microscope of the section of the molded structure according to the present invention.

This electron microscope was obtained by taking a photograph of the section of the first molded structure of the present invention by means of a scanning type electron microscope, said molded structure being obtained as a film of 50 μm in thickness and dyed with osmic acid and ruthenium.

In FIG. 1, black portions represent the ethylene/unsaturated ester copolymer (A) present as a matrix layer, and the ethylene/vinyl alcohol copolymer (B) is dispersed along the film surface in the form of thin layers, without uneven distribution, and is observed as a portion surrounded by discontinuous white lines.

The molded structures of the invention have such a stratiform structure as mentioned above.

BEST EMBODIMENT OF THE INVENTION

The molded structures obtained from the ethylene copolymer compositions of the present invention, and said ethylene copolymer compositions are illustrated below in detail.

The term "polymer" used in the present invention is intended sometimes to designate not only homopolymer but also copolymer.

First, the ethylene copolymer compositions from which the molded structures of the present invention are formed are illustrated hereinafter.

Molded structure

The ethylene copolymer compositions of the invention comprises (A) an ethylene/unsaturated ester copolymer and (B) an ethylene/vinyl alcohol copolymer.

The ethylene/unsaturated ester copolymer (A) used in the ethylene copolymer compositions of the invention comprises 85-65% by weight, preferably 85-72% by weight of ethylene structural units and 15-35% by weight, preferably 15-28% by weight of unsaturated ester structural units.

If the ethylene copolymer composition contains less than 15% by weight of the unsaturated ester structural units, said composition tends to decrease in gas barrier properties and, on the contrary, if said composition contains the unsaturated ester structural units in an amount exceeding 35% by weight, the molded structure resulting therefrom tends to decrease in strength.

The ethylene/unsaturated ester copolymer (A) has a melt flow rate of 0.5-20 g/10 min, preferably 1-15 g/10 min as measured at 190° C. under a load of 2160 g.

The ethylene/unsaturated ester copolymer (A) as illustrated above may be obtained by copolymerization of ethylene and unsaturated ester. In this case, the unsaturated ester used may be either carboxylic acid unsaturated ester or unsaturated carboxylic acid ester. Concretely, these unsaturated esters include, for example, vinyl acetate, acrylic ester and methacrylic ester. Ester components of acrylic ester or methacrylic ester are, for example, alkyl esters of 1 to 8 carbon atoms. Of these alkyl esters, preferred are methyl esters or ethyl esters.

The ethylene/vinyl alcohol copolymer (B) used in the ethylene copolymer compositions of the invention comprises 50-20 mol%, preferably 45-25 mol% of ethylene structural units and 50-80 mol%, preferably 55-75 mol% of vinyl alcohol structural units. Such copolymers (B) as mentioned above may be obtained by saponifying the corresponding ethylene/vinyl acetate copolymer in such a proportion that the saponification value becomes not less than 95%, preferably not less than 99%. The ethylene/vinyl alcohol copolymers (B) have a melt flow rate of 0.5-30 g/10 min, preferably 1-20 g/10 min as measured at 210° C. under a load of 2160 g.

The ethylene/vinyl alcohol copolymers (B) have an apparent melt viscosity, as measured at 220° C. and a rate of shear of 100 $sec^{-1}$, smaller by 300-1000 Pa·s, preferably smaller by 400-900 Pa·s than that of the ethylene/unsaturated ester copolymers (A).

By virtue of the fact that the ethylene copolymer composition is formed from the ethylene/unsaturated ester copolymer (A) and ethylene vinyl alcohol copolymer (B) having such a difference in apparent melt viscosity between them as shown above, said ethylene copolymer composition comes to be capable of forming a molded structure in which the ethylene/vinyl alcohol copolymer (B) has been dispersed in the form of thin layers without uneven distribution.

The ethylene copolymer composition from which the first molded structure of the present invention is formed comprises the above-mentioned ethylene/unsaturated ester copolymer (A) and ethylene/vinyl alcohol copolymer (B), said copolymer (A) being present in an amount of 50-80% by weight, preferably 55-70% by weight, and said copolymer (B) being present in an amount of 20-50% by weight, preferably 30-45% by weight.

The ethylene copolymer compositions having such constituents as mentioned above are excellent in heat stability, drawing properties and film-forming properties at the time of molding thereof.

The first molded structures of the invention are formed from the ethylene copolymer compositions as illustrated above.

The molded structures of the invention have such a structure in which the above-mentioned ethylene/vinyl alcohol copolymer (B) has been dispersed in the form of thin layers without uneven distribution. More particularly, the copolymer (B) forms discontinuous thin layer along the direction of surface of the molded structure, and the resulting molded structure has in its main portion a stratiform structure in which the copolymer (B) has been dispersed substantially without uneven distribution. Such a structure as mentioned above is shown in the aforementioned electron microscope of FIG. 1.

Because of their stratiform structure as mentioned above, the molded structures of the invention are excellent in gas barrier properties though they have been formed from the compositions containing 50-20% by weight of the ethylene/vinyl alcohol copolymer (B).

The molded structures of the invention are preferably those having a broad area and a relatively small thickness, and they may be of various shapes such as film, sheet, hollow container or the like.

The molded structures of the invention have a thickness of usually 5-1000 μm, preferably 20-500 μm, and they exhibit excellent gas barrier properties even when they are thin layers having a thickness of 30-50 μm.

The molded structures as illustrated above may be molded out of the above-mentioned ethylene copolymer compositions of the invention. In that case, the molding operation is preferably carried out by kneading together the above-mentioned components (A) and (B) of the ethylene copolymer composition and then feeding the resulting kneaded product to a molding machine, though said molding operation may be carried out by continuously kneading and feeding said components (A) and (B). The kneading operation is preferably carried out usually under the conditions of a kneading temperature of 170°–235° C., a rate of shear of 10–2000 sec$^{-1}$, and a retention time of 10 sec to 5 min.

The molding operation may be carried out by such a method that the molten ethylene copolymer composition flows in the direction of the face of the resulting molded structure. Concretely speaking, the molding of the ethylene copolymer compositions can be carried out by such a method as extrusion, blow molding, injection molding, injection-blow molding and vacuum forming.

In preparing the molded structures from the ethylene copolymer compositions as illustrated above, said copolymer compositions may be incorporated with various additives according to the purpose for which the compositions are used. Such additives as may be used for the purpose include, for example, antioxidants, heat stabilizers, drying agents, nucleating agents, antistatic agents and in addition thereto barrier properties imparting fillers such as mica. The addition to the ethylene copolymer compositions of the drying agent is preferred, because a tendency that the ethylene/vinyl alcohol copolymer (B) component of the ethylene copolymer composition absorbs water to decrease the resulting molded structure in gas barrier properties can be relaxed. Further, the resulting molded structure can be further improved in gas barrier properties by loading the ethylene copolymer composition with mica.

In the ethylene copolymer compositions of the invention used for forming the molded structures, it is presumed that because the apparent melt viscosity of the above-mentioned ethylene/vinyl alcohol copolymer (B) is smaller by 300–1000 Pa·s than that of the ethylene/unsaturated ester copolymer (A), the ethylene/vinyl alcohol copolymer is dispersed at the time of molding in the form of thin layers along the direction of the surface of the molded structure.

The first molded structures of the invention are excellent in gas barrier properties and pinhole resistance and, moreover, they are markedly superior in water absorbing properties to the molded structures obtained from the ethylene copolymer compositions containing only the ethylene/vinyl alcohol copolymer (B).

The first molded structures of the invention may be laminated with layers composed of other materials. Such materials as may be used herein include, for example, polyolefins such as high density polyethylene, medium density polyethylene, low density polyethylene, linear low density polyethylene, polypropylene and poly-4-methyl-1-pentene, polyesters such as polyethylene terephthalate and polybutylene terephthalate, thermoplastic resins represented by polyamides such as nylon-6 and nylon-6,6, thermosetting resins such as polyurethane, various elastomers, metallic materials such as aluminum foil, and paper. In the laminated structures mentioned above, one or two or more of the molded structure layer of the invention may be contained as a surface layer or interlayer of the laminated structure.

Ethylene copolymer composition

The first ethylene copolymer compositions of the present invention are illustrated hereinafter.

The ethylene copolymer composition of the invention comprises the aforementioned ethylene/unsaturated ester copolymer (A), ethylene/vinyl alcohol copolymer (B) and the following graft-modified product of an ethylene/α-olefin copolymer (C).

The graft modified product (C) of ethylene/α-olefin copolymer used in the invention may be obtained by modification of the ethylene/α-olefin copolymer with unsaturated carboxylic acid or its anhydride.

The ethylene/α-olefin copolymer used herein comprises 60–90 mol%, preferably 70–85 mol% of ethylene structural units and 40–10 mol%, preferably 30–15 mol% of structural units derived from α-olefin other than ethylene.

The α-olefin used herein includes concretely those having about 3–8 carbon atoms, preferably propylene, 1-butene, 1-pentene and 4-methyl-1-pentene.

The ethylene/α-olefin copolymers used in the present invention are low crystalline or non-crystalline, and concretely have a crystallinity index, as measured by the X-ray diffractometry, of usually not more than 30%, preferably not more than 20%.

This ethylene/α-olefin copolymers desirably have a melt flow rate at 190° C. and a load of 2160 g of usually 0.3–50 g/10 min, preferably 0.5–20 g/10 min.

The unsaturated carboxylic acid or its anhydride used in graft modifying the above-mentioned ethylene/α-olefin copolymer includes concretely acrylic acid, methacrylic acid, fumaric acid, maleic acid, nadic acid, maleic anhydride, itaconic anhydride and nadic anhydride. Of the acids and anhydrides thereof, particularly preferred is maleic acid or maleic anhydride.

The graft-modified product (C) of the ethylene/α-olefin copolymer is preferably modified so that the grafted amount becomes usually 0.03–7% by weight, preferably 0.05–5% by weight.

Besides the graft modified product of the ethylene/α-olefin copolymer used in the ethylene copolymer compositions of the invention, graft modified products, for example, an ethylene/vinyl acetate copolymer graft-modified product are known. However, when graft modified products other than those of the ethylene/α-olefin copolymer are used as the graft modified products (C) in the invention, the gas barrier properties of the resulting molded structure sometimes decrease greatly depending upon the amount of the other graft modified product used in the ethylene copolymer composition. In contrast thereto, practically no decrease in gas barrier properties is observed in the resulting molded structure even when the graft modified product (C) of the ethylene/α-olefin copolymer of the invention is used in a relatively large amount in the ethylene copolymer composition of the invention. In addition, in an ethylene copolymer molded structure formed from an ethylene copolymer composition containing copolymers (A), (B), and a graft modified product (C) of a non-crystalline or low crystalline ethylene/α-olefin copolymer, the ethylene/vinyl alcohol copolymer (B) of the composition has been dispersed into the structure in the form of thin layers.

The ethylene copolymer compositions of the invention comprise the above-mentioned ethylene/unsaturated ester copolymer (A) in amounts of 30–75% by weight, preferably 40–65% by weight, ethylene/vinyl alcohol copolymer (B) in amounts of 20–50% by weight, preferably 30–45% by weight and graft modified product (C) in amounts of 1–40% by weight, preferably 5–30% by weight.

The ethylene copolymer compositions of the invention having such composition as mentioned above are excellent in heat stability, drawing properties and film forming properties at the time of molding thereof, and are capable of forming molded structures excellent in gas barrier properties and pinhole resistance.

Since the ethylene copolymer compositions of the invention contain the graft modified product (C) of the ethylene/α-olefin copolymer in an amount as defined above, the ethylene copolymer compositions have been improved further in extrusion kneading properties and film forming properties.

When the ethylene copolymer compositions contain large amounts of the graft modified product (C), the molded structure resulting therefrom sometimes decreases in gas barrier properties. In the case of the ethylene copolymer compositions of the invention containing the graft modified product (C) in such an amount as defined above, practically no decrease in gas barrier properties is observed in the molded structure resulting therefrom.

The second molded structures of the invention are formed from the above-mentioned first ethylene copolymer as mentioned above.

The second molded structures of the invention have a stratiform structure similar to that of the first molded structures of the invention as mentioned above.

The second molded structures may take the same shapes as those of the first molded structures as mentioned above, and may be molded in the same manner as in the case of the first molded structures of the invention.

The second molded structures may be obtained by using extruders having usual kneading functions, and it is not necessary to employ such extrusion conditions under which a laminar flow is formed. Further, a sheet-like molded structure obtained may be formed into a container of the desired shape by fabrication technique such as vacuum or air-pressure forming.

EFFECT OF THE INVENTION

In the first ethylene copolymer molded structures provided according to the present invention, the ethylene/vinyl alcohol copolymer (B) is dispersed in the form of thin layers without uneven distribution, hence the molded structures are excellent in gas barrier properties. Because of low water absorption properties, the first ethylene copolymer molded structures are small in dependence on humidity. Furthermore, the molded structures obtained as films and the like are excellent in pinhole resistance as well, and are useful as various packaging materials such as food wrap films.

The first ethylene copolymer compositions of the invention comprise an ethylene/unsaturated ester copolymer (A) containing a specific amount of unsaturated ester structural units, an ethylene/vinyl alcohol copolymer (B) having an apparent melt viscosity varying by a specific value from that of said copolymer (A), and a graft modified product (C) of an ethylene/α-olefin copolymer, and hence the ethylene copolymer compositions are excellent in heat stability and drawing properties at the time of molding thereof and, at the same time, exhibit further improved extrusion-kneadability and film forming properties at the time of molding thereof.

The second molded structures provided according to the invention are formed from the above-mentioned ethylene copolymer compositions, and have a stratiform structure similar to that of the first molded structures of the invention, and hence are excellent in gas barrier properties and also in pinhole resistance.

EXAMPLE

The present invention is illustrated below more in detail with reference to examples. In this connection, the kneading method, molding-processing method, evaluation and analytical method employed for the resins used in the examples and comparative examples were conducted by the following procedures under the conditions mentioned below.

(1) MFR (melt flow rate)

The measurement was conducted in accordance with JIS K-760.

Temperature: 190° C. or 210° C. (190° C. in the measurement of the composition)
Load: 2160 g (2) Apparent melt viscosity Using Instron (U.S.A.) capillary rheometer 3211, the shearing stress was detected at a melting temperature and shearing rate as prescribed to calculate an apparent melt viscosity therefrom. Particulars of this measurement are as follows:

Specification of the capillary rheometer 3211
Plunger speed . . . 0.06–20 cm/min
Load capacity . . . 500–2000 kg
Test temperature . . . 40°–399° C.
Temperature control . . . ±2° C. at barrel portion. ±0.5° C. at capillary portion.
Barrel . . . Diameter 0.953±0.0013 cm. Effective length 25 cm. (Including capillary portion)
Capillary . . . Diameter 0.0762 cm. Length 2.54 cm. Material Tungsten carbide
Entrance angle . . . 90°.

(3) Method for kneading resin

The resins were melt kneaded in the prescribed proportion under the following conditions.

Kneader . . . Single screw extruder, 30 mmφ
Screw . . . Plunger head type single flight screw L/D=33

| Barrel Temperature (°C.) | | | | | |
| --- | --- | --- | --- | --- | --- |
| C 1 | C 2 | C 3 | C 4 | C 5 | D |
| 80 | 150 | 180 | 200 | 200 | 180 |

Screw speed . . . 40 rpm (4) Extrusion kneadability

The extrusion kneadability was judged by visual observation of the state of strand of the molten resin extruded through the die at the time of kneading the resin in (3) above.

(5) Method for forming film and evaluation of formability

Blown films were formed by means of a blown film machine comprising a single screw full flight extruder of 30 mmφ under the following conditions.

| C 1 | C 2 | C 3 | C 4 | H | D |
| --- | --- | --- | --- | --- | --- |
| 150 | 200 | 200 | 200 | 200 | 200 |
| | | Examples 1, 3–7, 9–18 | | Examples 2, 8 | |
| Screw speed | | 45 rpm | | 60 rpm | |
| Haul-off speed | | 3 m/min | | 4 m/min | |
| Film thickness | | 50 μm | | 50 μm | |

The resins used in the examples and comparative examples are shown in Table 1.

TABLE 1

| Classification | Name | Composition | MFR [dg/min] 190° C. 2160 g | MFR [dg/min] 210° C. 2160 g | Apparent melt viscosity [Pa · S] (220° C., 100 sec$^{-1}$) |
| --- | --- | --- | --- | --- | --- |
| [A] Ethylene polymer | (1) Evaflex EV460[1)] | Ethylene/ vinyl acetate copolymer, VA content 19 wt % | 2.5 | | 452 |
| | (2) Evaflex EV560[1)] | VA content 14 we % | 3.5 | | 368 |
| | (3) Evaflex EV450[1)] | VA content 19 wt % | 15 | | 112 |
| | (4) Evaflex EV170[1)] | VA content 33 wt % | 1 | | 592 |
| | (5) Evaflex EV360[1)] | VA content 25 wt % | 2 | | 487 |
| | (6) $\frac{EV450}{EV460} = \frac{80}{20}$ | VA content 19 wt % | 10 | | 191 |
| | (7) Evaflex EV270[1)] | VA content 28 wt % | 1 | | 586 |
| | (8) Mirason PO607[2)] | VA content 6 wt % | 23 | | 98 |
| | (9) Mirason M-16[2)] | Ethylen polymer, VA content 0 wt % | 3.7 | | 390 |
| | (10) Toughmer A4085[2)] | Ethylene/ 1-butene copolymer, Butene content 15 mol % | 3.5 | | 372 |
| [B] Ethylene/ vinyl alcohol copolymer | (1) Sealer OH[3)] 4416 | VOH content 56 mol % | | 16 | 4 |
| | (2) Sealer OH[3)] 3007 | VOH content 70 mol % | | 7 | 6 |
| | (3) Sealer OH[3)] 3003 | VOH content 70 mol % | | 3 | 15 |
| [C] Ethylene copolymer graft-modified product | (1) Ethylene/1-butene copolymer MAH modified product | Butene content 15 mol % MAH content 1 wt % | 2.3 | | 659 |
| | (2) Ethylene/vinyl acetate copolymer MAH modified product | VA content 19 wt % MAH content 1 wt % | 6.0 | | 298 |

[1)]Product of Du Pont-Mitsui Polychemicals Co., Ltd.
[2)]Product of Mitsui Petrochemical Industries, Ltd.
VA: vinyl acetate
[3)]Product of Du Pont
VOH: Vinyl alcohol
MAH: Maleic anhydride

| | | |
| --- | --- | --- |
| Blow-up ratio | 2.8 | 2.8 |

The film formability was judged by observation of the stable state of bubbles at the time of molding the blown films.

In Examples 2 and 8, the films were formed by changing the discharging rate of the molten resin from the extruder.

In this connection, the above-mentioned molding conditions are those employed in ordinary blown film forming method, and no particular procedure such as control of dispersion or flowing state of the ethylene/vinyl alcohol resin.

(6) Measurement of the amount of oxygen gas permeated

Using a gas permeability tester (differential pressure method) manufactured and sold by Toyo Seiki K.K., the amount of oxygen gas permeated through a film of 50 μm in thickness obtained by the method shown in the (5) above in an atmosphere of 23° C.×50% RH was measured.

EXAMPLES 1–6

The ethylene/vinyl acetate copolymer (A) and the ethylene/vinyl alcohol copolymer (B) shown in Table 1 were kneaded in the proportion as indicated in Table 2 by the method as described in the aforementioned (3) to prepare an ethylene copolymer composition. MFR of the ethylene copolymer composition thus obtained and the amount of oxygen permeated through a film obtained from said composition were measured.

Results obtained are shown in Table 2.

A photograph of the section of the film of Example 1 taken by electron microscope is shown in FIG. 1.

COMPARATIVE EXAMPLES 1–6

The ethylene copolymer (A) and the ethylene/vinyl alcohol copolymer (B) shown in Table 1 were kneaded in the proportion as indicated in Table 3 by the method as described in the aforementioned (3) to prepare an ethylene copolymer composition. MFR of the ethylene copolymer composition thus obtained and the amount of oxygen permeated through a film obtained from said composition were measured.

Results obtained are shown in Table 3.

TABLE 2

| Example | Ethylene copolymer composition (wt %) | Screw speed at the time of molding film rpm | MFR dg/min | Difference in apparent melt viscosity A–B [Pa · S] (220° C., 100 sec$^{-1}$) | Amount of oxygen permeated 50 μm cm$^3$/m$^2$ · 24 hr · atm |
|---|---|---|---|---|---|
| 1 | A-(1)/B-(1) = 60/40 | 45 | 3.6 | 448 | 8.6 |
| 2 | A-(1)/B-(1) = 60/40 | 60 | 3.6 | 448 | 10.0 |
| 3 | A-(1)/B-(1) = 70/30 | 45 | 3.3 | 448 | 54.0 |
| 4 | A-(1)/B-(2) = 70/30 | 45 | 2.1 | 446 | 22.0 |
| 5 | A-(4)/B-(1) = 60/40 | 45 | 2.8 | 558 | 6.8 |
| 6 | A-(5)/B-(1) = 60/40 | 45 | 3.2 | 483 | 9.4 |

TABLE 3

| Comp. Example | Ethylene copolymer composition (wt %) | Screw speed at the time of molding film rpm | MFR dg/min | Difference in apparent melt viscosity A–B [Pa · S] (220° C., 100 sec$^{-1}$) | Amount of oxygen permeated 50 μm cm$^3$/m$^2$ · 24 hr · atm |
|---|---|---|---|---|---|
| 1 | A-(2)/B-(1) = 70/30 | 45 | 4.4 | 364 | 1300 |
| 2 | A-(3)/B-(3) = 60/40 | 45 | 12.3 | 97 | 7560 |
| 3 | A-(9)/B-(1) = 70/30 | 45 | 4.2 | 386 | 2330 |
| 4 | A-(6)/B-(1) = 60/40 | 45 | 10.9 | 176 | 896 |
| 5 | A-(1) | 45 | 2.5 | — | 7550 |
| 6 | A-(3) | 45 | 15 | — | 7930 |

EXAMPLES 7–18

The three components, i.e. the ethylene/vinyl acetate copolymer (A), ethylene/vinyl alcohol copolymer (B) and ethylene/α-olefin copolymer graft-molded product (C) shown in Table 1 were kneaded in the proportions as indicated in Table 4 by the method as described in the aforementioned (3) to prepare an ethylene copolymer composition. The performance of the resulted composition and the molded structure obtained therefrom, such as extrusion kneadability, film-forming properties and the amount of oxygen permeated through the blown film, was evaluated.

Results obtained are shown in Table 4.

TABLE 4

| Example | Ethylene copolymer composition (wt %) | Extrusion kneadability | Film forming properties | Difference in apparent melt viscosity A–B [Pa · S] (220° C., 100 sec$^{-1}$) | Amount of oxygen permeated 50 μm cm$^3$/m$^2$ · 24 hr · atm |
|---|---|---|---|---|---|
| 7 | A-(1)/B-(1)/C-(1) 42/40/18 | good | ○ | 448 | 20 |
| 8 | A-(1)/B-(1)/C-(1) 42/40/18 | good | ○ | 448 | 22 |
| 9 | A-(1)/B-(1)/C-(1) 63/30/7 | good | ○ | 448 | 97 |
| 10 | A-(1)/B-(1)/C-(1) 50/40/10 | good | ○ | 448 | 15 |
| 11 | A-(1)/B-(1)/C-(1) 35/30/35 | good | Δ | 448 | 152 |
| 12 | A-(1)/B-(1)/C-(1) 55/30/15 | good | ○ | 448 | 42 |
| 13 | A-(4)/B-(1)/C-(1) 50/40/10 | good | ○ | 588 | 10 |
| 14 | A-(4)/B-(2)/C-(1) 50/40/10 | good | ○ | 588 | 18 |
| 15 | A-(4)/B-(3)/C-(1) 50/40/10 | good | ○ | 577 | 78 |

TABLE 4-continued

| Example | Ethylene copolymer composition (wt %) | Extrusion kneadability | Film forming properties | Difference in apparent melt viscosity A-B [Pa · S] (220° C., 100 sec⁻¹) | Amount of oxygen permeated 50 μm cm³/m² · 24 hr · atm |
|---|---|---|---|---|---|
| 16 | A-(5)/B-(1)/C-(1) 50/40/10 | good | ○ | 483 | 8 |
| 17 | A-(7)/B-(2)/C-(1) 50/40/10 | good | ○ | 580 | 21 |
| 18 | A-(7)/B-(3)/C-(1) 50/40/10 | good | ○ | 571 | 73 |

*○: good △: unstable X: failed in film forming

COMPARATIVE EXAMPLES 7-13

The three components, i.e. the ethylene/vinyl acetate copolymer (A), ethylene/vinyl alcohol polymer (B) and the ethylene/α-olefin copolymer graft-modified product (C) shown in Table 1 were kneaded in the proportions as indicated in Table 5 by the method as described in the aforementioned (3) to prepare an ethylene copolymer composition. The performance of the resulted composition and the molded structure obtained therefrom, such as extrusion kneadability, film forming properties and the amount of oxygen permeated through the blown film, was evaluated.

Results obtained are shown in Table 5.

TABLE 5

| Comp. Example | Ethylene copolymer composition (wt %) | Extrusion kneadability | Film forming properties | Difference in apparent melt viscosity A-B [Pa · S] (220° C., 100 sec⁻¹) | Amount of oxygen permeated 50 μm cm³/m² · 24 hr · atm |
|---|---|---|---|---|---|
| 7 | A-(1)/B-(1)/C-(1) 20/30/50 | Melt fracture | X | 448 | 264 |
| 8 | A-(1)/B-(1)/C-(2) 42/40/18 | good | △ | 448 | 3260 |
| 9 | A-(8)/B-(1)/C-(1) 50/30/20 | good | ○ | 94 | 2013 |
| 10 | A-(9)/B-(1)/C-(1) 63/30/7 | good | ○ | 386 | 2020 |
| 11 | A-(9)/B-(1)/C-(2) 63/30/7 | good | △ | 386 | 2080 |
| 12 | A-(10)/B-(1)/C-(1) 49/30/21 | good | △ | 368 | 6340 |
| 13 | A-(3)/B-(1)/C-(2) 50/40/10 | good | ○ | 108 | 7330 |

*○: good △: unstable X: failed in film forming

What is claimed is:

1. An ethylene copolymer molded structure including an ethylene copolymer composition comprising:
   (A) 50-80% by weight of an ethylene/unsaturated ester copolymer having 85-65% by weight of ethylene structural units, 15-35% by weight of unsaturated ester structural units, and a melt flow rate of 0.5-20 g/10 min as measured at 190° C. under a load of 2160 g, wherein said unsaturated ester is carboxylic acid unsaturated ester or unsaturated carboxylic acid ester, and
   (B) 50-20% by weight of an ethylene/vinyl alcohol copolymer having 50-20 mol% of ethylene structural units, 50-80 mol% of vinyl alcohol structural units, and a melt flow rate of 0.5-30 g/10 min as measured at 210° C. under a load of 2160 g,
   said ethylene vinyl alcohol copolymer (B) having an apparent melt viscosity, as measured at 220° C. and a rate of shear of 100 sec⁻¹, smaller by 300-1000 Pa·s than that of said ethylene/unsaturated ester copolymer (A), and said ethylene/vinyl alcohol copolymer (B) being dispersed into said molded structure in the form of thin layers.

2. An ethylene copolymer composition comprising:
   (A) 30-75% by weight of an ethylene/unsaturated ester copolymer having 85-65% by weight of ethylene structural units, 15-35% by weight of unsaturated ester structural units, and a melt flow rate, as measured at 190° C. under a load of 2160 g, of 0.5-20 g/10 min, wherein said unsaturated ester is carboxylic acid unsaturated ester or unsaturated carboxylic acid ester,
   (B) 50-20% by weight of an ethylene/vinyl alcohol copolymer having 50-20 mol% of ethylene structural units, 50-80 mol% of vinyl alcohol structural units, and a melt flow rate, as measured at 210° C. under a load of 2160 g, of 0.5-30 g/10 min, and
   (C) 1-40% by weight of a graft modified product of a non-crystalline or low crystalline ethylene/α-olefin copolymer having 60-90 mol% of ethylene structural units and 40–10 mol% of α-olefin structural units, said α-olefin being of 3–8 carbon atoms, said ethylene/α-olefin copolymer (C) having a crystallinity index, as measured by the X-ray diffractometry, of less than or equal to 30%, and being graft modified by using an unsaturated carboxylic acid or its anhydride, said ethylene/vinyl alcohol copolymer (B) having an apparent melt viscosity, as measured at 220° C. and a rate of shear of 100 sec$^{-1}$, smaller by 300–1000 Pa·s than the apparent melt viscosity of said ethylene/unsaturated ester copolymer (A).

3. An ethylene copolymer molded structure formed from the ethylene copolymer composition as claimed in claim 2, wherein said ethylene/vinyl alcohol copolymer (B) of said composition has been dispersed into said structure in the form of thin layers.

4. The ethylene copolymer molded structure of claim 1, wherein said unsaturated ester of said copolymer (A) is selected from the group consisting of vinyl acetate, acrylic ester and methacrylic ester.

5. The ethylene copolymer composition of claim 2, wherein said unsaturated ester of said copolymer (A) is selected from the group consisting of vinyl acetate, acrylic ester and methacrylic ester.

6. The ethylene copolymer composition of claim 2, wherein said α-olefin of said copolymer (C) is selected from the group consisting of propylene, 1-butene, 1-pentene and 4-methyl-1-pentene.

7. An ethylene copolymer composition comprising:
   (A) 50–80% by weight of an ethylene/unsaturated ester copolymer having 85–65% by weight of ethylene structural units, 15–35% by weight of unsaturated ester structural units, and a melt flow rate of 0.5–20 g/10 min as measured at 190° C. under a load of 2160 g, wherein said unsaturated ester is carboxylic acid unsaturated ester or unsaturated carboxylic acid ester, and
   (B) 50–20% by weight of an ethylene/vinyl alcohol copolymer having 50–20 mol% of ethylene structural units, 50–80 mol% of vinyl alcohol structural units, and a melt flow rate of 0.5–30 g/10 min as measured at 210° C. under a load of 2160 g, said ethylene vinyl alcohol copolymer (B) having an apparent melt viscosity, as measured at 220° C. and a rate of shear of 100 sec$^{-1}$, smaller by 300–1000 Pa·s than that of said ethylene/unsaturated ester copolymer (A), and said ethylene/vinyl alcohol copolymer (B) being dispersed into said molded structure in the form of thin layers.

* * * * *

UNITED STATES PATENT AND TRADEMARK OFFICE
CERTIFICATE OF CORRECTION

PATENT NO. : 5,319,022
DATED : June 7, 1994
INVENTOR(S) : Toru Fukada and Hiroshi Ito It is certified that error appears in the above-indentified patent and that said Letters Patent is hereby corrected as shown below:

Column 2 Line 54 "noncrystalline" should read --non-crystalline--.

Column 6 Line 20 "This" should read --The--.

Table 1, in Classification [A] Ethylene polymer, under the heading Name, across from (9) Mirason M-16[2], Column 9, "Ethylen" should read --Ethylene--.

Table 1, under the heading Composition, across from (2) Evaflex EV560[1], Column 10, "we" should read --wt--.

Claim 1 Line 18 Column 14 "ethylene vinyl" should read --ethylene/vinyl--.

Claim 7 Line 19 Column 16 "ethylene vinyl" should read --ethylene/vinyl--.

Signed and Sealed this

Twentieth Day of September, 1994

Attest:

BRUCE LEHMAN

Attesting Officer    Commissioner of Patents and Trademarks